United States Patent [19]

Suur-Askola

[11] Patent Number: 4,908,563
[45] Date of Patent: Mar. 13, 1990

[54] METHOD AND DEVICE FOR BRAKING A SQUIRREL-CAGE MOTOR

[75] Inventor: Seppo Suur-Askola, Awans, Belgium

[73] Assignee: Kone Elevator GmbH, Baar, Switzerland

[21] Appl. No.: 192,791

[22] Filed: May 10, 1988

[30] Foreign Application Priority Data

May 12, 1987 [FI] Finland .................................. 872101

[51] Int. Cl.[4] ............................................. H02P 3/24
[52] U.S. Cl. .................................................. 318/760
[58] Field of Search ...................... 318/760, 761, 762; 187/119

[56] References Cited

U.S. PATENT DOCUMENTS 3,866,097  2/1975  Anzai et al. ........................ 318/761
4,083,431  4/1978  Oohira et al. ...................... 187/119
4,491,197  1/1985  Nisaiwaki ........................... 318/762
4,741,415  5/1988  Nomura ............................. 318/762

Primary Examiner—David Smith, Jr.
Attorney, Agent, or Firm—Sughrue, Mion, Zinn, Macpeak & Seas

[57] ABSTRACT

A method and device are disclosed for braking a squirrel-cage motor in which the motor is controlled in a manner known per se by means of a voltage converter and a control circuit which switches off the main current to the motor in a braking situation, whereupon a direct current is supplied to the motor windings. To achieve a simple and inexpensive braking control system, the direct current fed into the motor windings is obtained from a rectifier bridge formed in the braking situation via electrical control from certain semiconductor components of the voltage converter.

2 Claims, 4 Drawing Sheets

METHOD AND DEVICE FOR BRAKING A SQUIRREL-CAGE MOTOR

FIELD OF THE INVENTION

The present invention relates to a method and device for braking a squirrel-cage motor, in which the motor is controlled in a manner known per se by means of a voltage converter and the main supply current to the motor is interrupted in a braking situation, whereupon the motor windings are supplied with a direct current.

Squirrel-cage motors often use a so-called direct-current braking method, by which the motor drive current is interrupted and the windings are then supplied with a direct current, which generates a standing field that induces a braking magnetic field in the squirrel-cage winding of the rotor. The braking process itself can be controlled by regulating the braking current so that the motor will work, e.g. in accordance with a preset braking time or r.p.m. profile.

DESCRIPTION OF THE PRIOR ART

Previously known braking methods comprise the braking of a one-speed or two-speed motor by supplying a direct current from a separate rectifier to two terminals of a one-speed motor, the supply of a direct current to one of the windings of a two-speed motor (see e.g. Finnish Patent No. 64255) and the reversal of the direction of rotation with no direct current supplied. The reversal of the direction of rotation can be implemented in most cases either by using mechanical contactors or via electric control of the power semiconductors of the voltage converters. The direct current produced may be either full-wave or half-wave rectified, depending on the circuit used.

The drawbacks of the previously known methods result from the fact that, due to the use of a separate rectifier, they require a relatively large number of expensive semiconductor components in the main circuit and often also a large number of expensive and bulky mechanical high-voltage contactors. Moreover, the contactors have the drawback of being slow in changing their state (the difference to an electronic circuit is of the order of a decade), with the result that, during the changeover, the motor will be in an indefinite currentless state which may lead to a runaway condition. Braking by reversing the direction of rotation has the drawback of low efficiency, especially in applications involving frequent braking, e.g. elevator motors, because the braking current is always equal to the starting current (5 ... 10 times nominal current) even if no braking torque is present.

BRIEF SUMMARY OF THE INVENTION

An object of the present invention is to achieve a braking method which is free from the drawbacks mentioned above.

Accordingly, one aspect of the invention provides a method for braking a squirrel-cage motor, which comprises controlling the motor by means of a voltage converter and interrupting the main current to the motor in a braking situation, whereupon the motor windings are supplied with a direct current, the direct current supplied to the motor windings being obtained from a rectifier bridge formed in the braking situation via electrical control from semiconductor components of the voltage converter.

Another aspect of the invention provides a control circuit for a squirrel-cage motor in which the motor is steplessly controlled using a voltage converter, the improvement of employing a rectifier constituted by electrically controllable semiconductor components of the voltage converter for supplying a direct current to the motor during braking.

The chief advantages of the invention are low cost and small size, achieved by minimizing the number of components and contactors, as well as improved efficiency. Thus, corresponding frequency converter drives, in which the power semiconductors are generally transistors, are considerably more complex and expensive than the method of the invention, which uses a thyristor-based voltage converter.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1A:
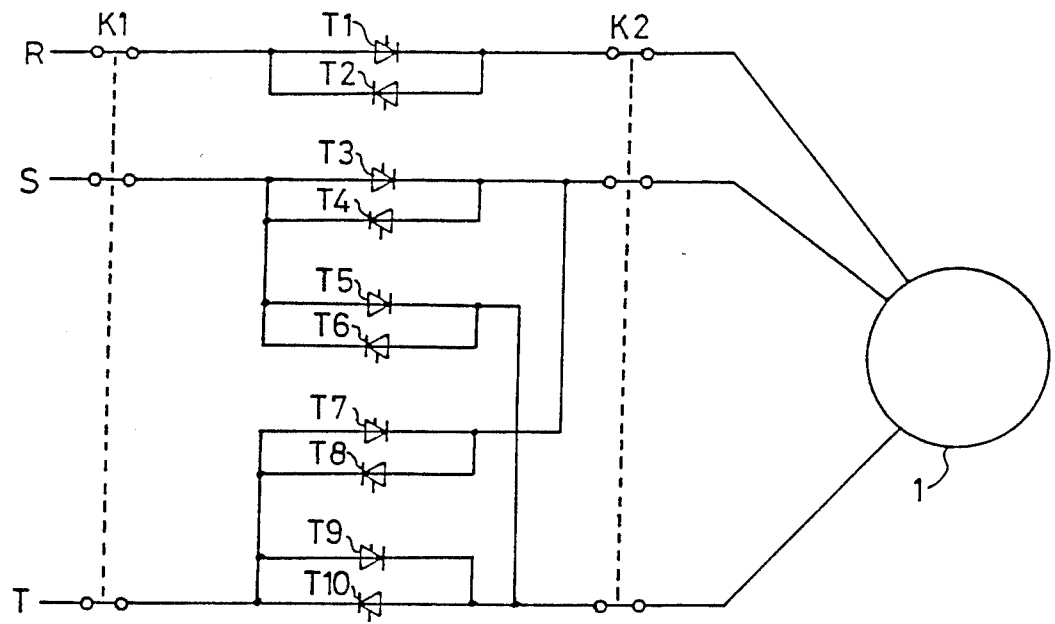
FIGS. 1a and 1b show a known thyristor bridge circuit and its principle of operation, to which the invention can be applied.

Referring now to the drawings, FIG. 1a shows a known thyristor bridge circuit which may be used to control a squirrel-cage motor 1 provided with one winding. For rotating the motor 1 in one direction, drive current is supplied via thyristors T1, T2; T3, T4 and T9, T10, and for rotation in the reverse direction, via thyristors T1, T2; T5, T6 and T7, T8. According to legal regulations concerning, e.g. elevator motors, it must be possible to switch off the supply current by means of at least two devices operating independently of each other. For this reason, the circuit in FIG. 1 includes contactors K1 and K2, although these are not relevant to the present invention as such.

Figure 1B:
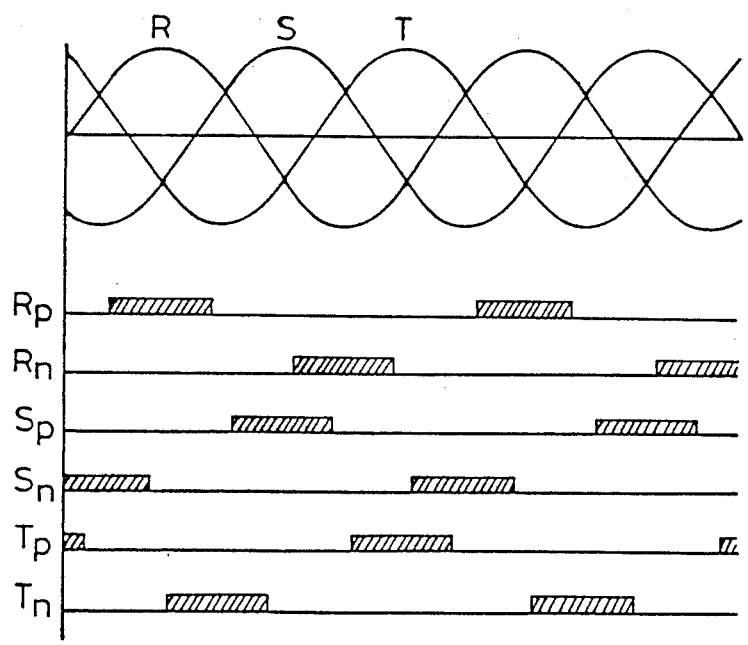

FIG. 1b shows how the operation of the thyristor bridge is synchronized with a three-phase mains current RST. The positive part of the supply current of each phase is indicated with the subscript p, e.g. $R_p$, and the corresponding negative part with the subscript n, e.g. $T_n$. As the meaning of the Figure will be clearly apparent to a person skilled in the art, normal thyristor bridge operation will not be explained here in detail.

Conventionally, as stated before, braking is implemented on the principle of reverse drive, i.e. by reversing the direction of rotation of the motor. The reversal of the direction of rotation for braking purposes, using a circuit like that in FIG. 1, is accomplished by changing the thyristor group during the drive.

Figure 2A:
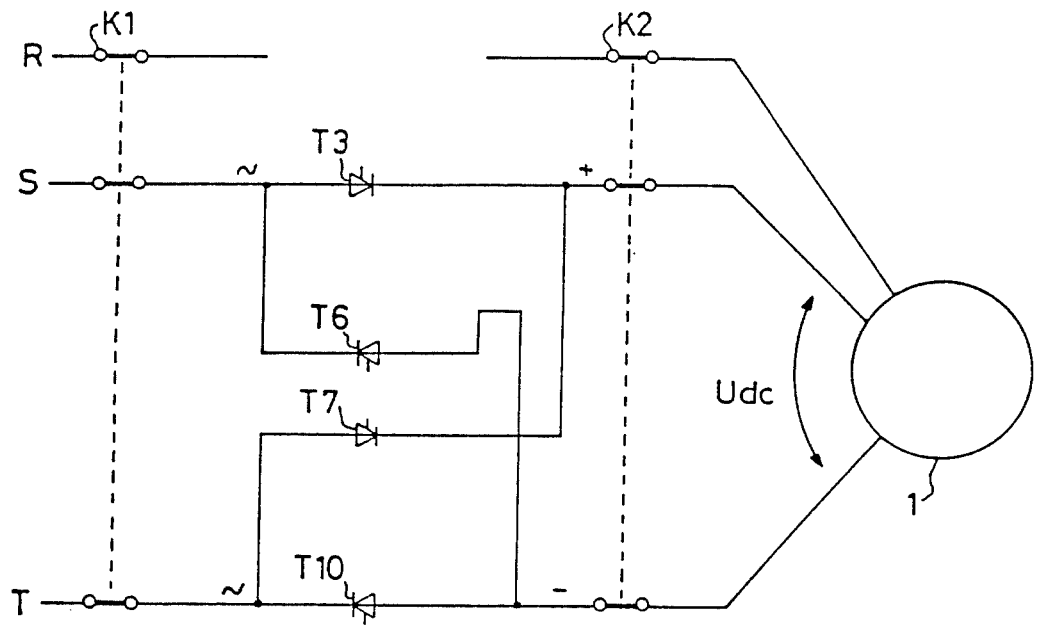
FIGS. 2a–2c are diagrams showing the thyristor bridge circuit of an embodiment of the invention and the principle of its control during direct current braking.

However, this method suffers from the drawbacks mentioned before. Instead, the method of the invention employs direct current braking accomplished by controlling the thyristor bridge in the manner shown in FIG. 2a. For the sake of clarity, all thyristors not involved in the braking process, as well as their current paths, have been omitted from the figure. In fact, FIG. 2a shows two direct current sources connected in parallel, the size of the direct current $U_{dc}$ supplied by the sources being separately controlled by interrupting the supply current to the direct current sources by means of the thyristor pairs T3, T6 and T7, T10.

To effect braking, the supply of current to the motor is switched off by turning off all the thyristors T1–T10. To eliminate all short-circuit paths, a currentless state of a duration of approximately 20 ms is generated in the motor, the duration of this state being dictated in the first place by variations in the thyristor characteristics. Next, the thyristors T3, T6, T7 and T10 are fired, thereby producing the circuit shown in FIG. 2a. These thyristors constitute a full-wave rectifier bridge, which in a well-known manner rectifies two phases of the three-phase mains supply, the direct current thus produced being applied to two terminals of the motor 1, while no current is applied to the third terminal. By regulating the duration of the conducting states of the thyristors, the direct current produced can be adjusted to the required level. The operations and the circuit used for this purpose are the same regardless of the duration of rotation at the time of braking.

Figure 2B:
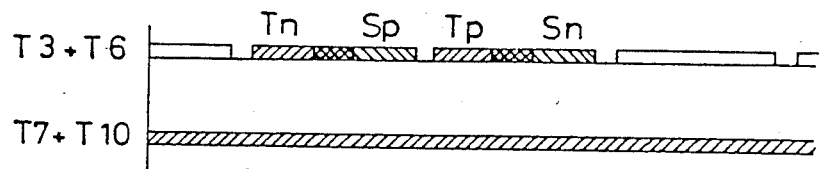

FIG. 2b shows the firing ranges for the thyristors T3, T6, T7 and T10 for direct current braking when a high torque is needed. In this case, thyristors T7 and T10 act as a zero diode, allowing the current to be maintained by the inductance of the motor windings. This reduces current fluctuations and therefore mechanical noise. This can not be achieved if half-wave rectification is employed.

Figure 2C:
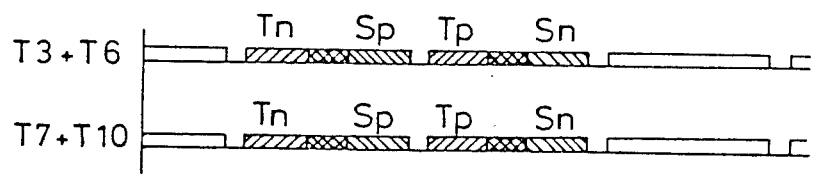

FIG. 2c shows the firing ranges for thyristors T3, T6, T7 and T10 for direct current braking in the case when a low braking torque is needed. When the braking current is small, an increase in the relative fluctuation of the current is no longer a problem. In this case, in order to achieve as fast as possible a changeover between the DC/AC states, the thyristor pair T7, T10 is also fired in the same way as the pair T3, T6 in FIG. 2b. The motor inductance will now oppose the direct current supplied, producing breaks in the current which enable a fast transition back to the tractive state.

Figure 3:
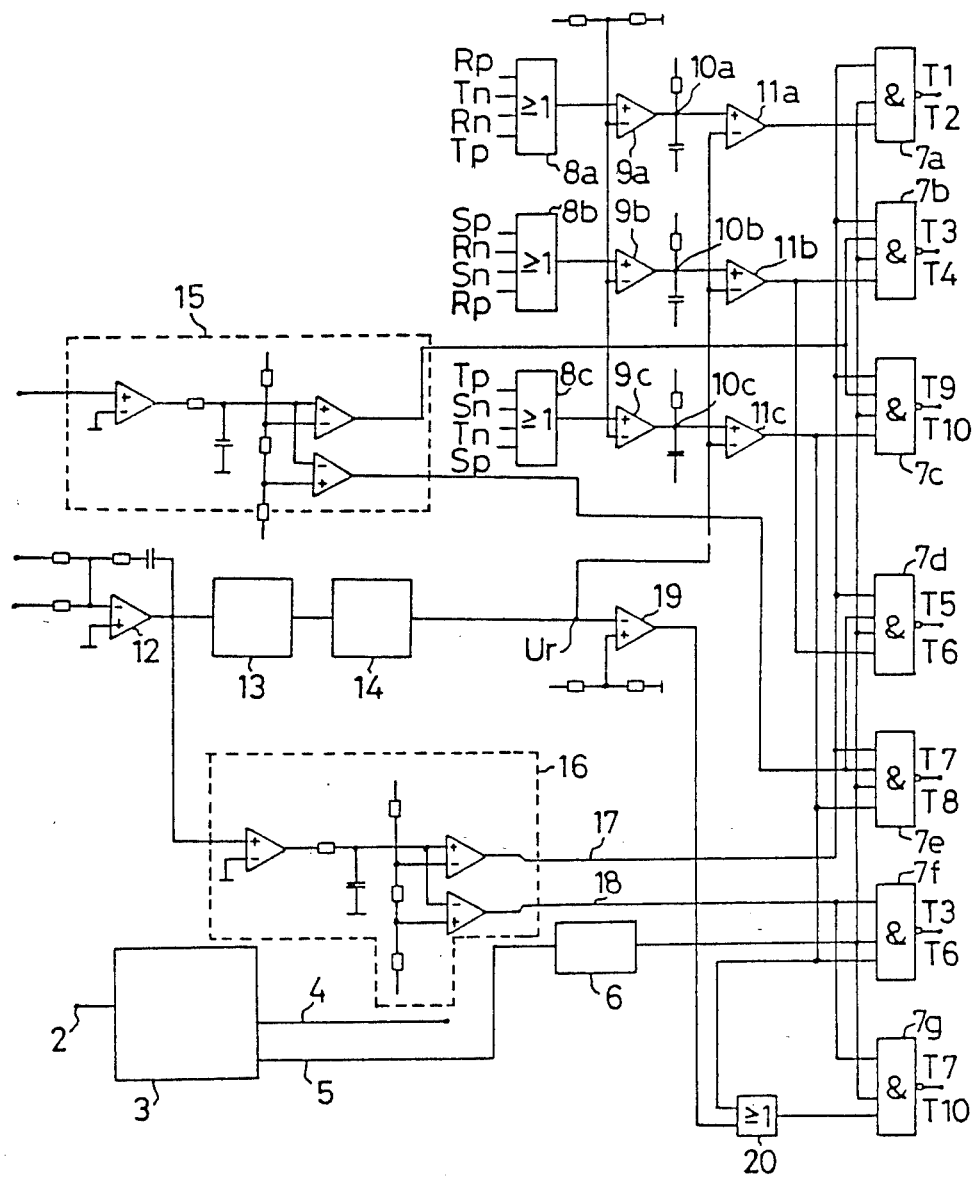
FIG. 3 shows an example of a logic circuit for thyristor control that may be used to implement the invention.

FIG. 3 shows a circuit for controlling a thyristor bridge similar to the one in FIG. 1 as provided by the invention. Roughly speaking, the circuit gathers the necessary information regarding the desired drive direction, the start signal given by the motor speed regulator, the desired drive mode (traction/braking), the issue of a drive command and the timing of thyristor firing as shown in FIG. 1b, and, using ordinary NAND-logic, combines these data to produce a thyristor firing scheme suited to the current situation.

A more detailed description of the operation of the circuit will now be given.

The drive command is applied to point 2, activating a logic circuit 3, e.g. a relay logic, so that it first activates the contactors K1 and K2 in FIG. 1 with a control command sent via line 4, whereupon, after a delay of about 100 ms, it sends a thyristor firing permission signal to the thyristor control circuit via line 5. When the motor is to be stopped, these operations are performed in the reverse order. The firing permission starts an oscillator 6, which serves as a clock and timer for the whole firing system, supplying pulses to inputs of NAND-gates 7a–7g at a frequency of 30 kHz.

The synchronization pulses as shown in FIG. 1b are input to OR-gates 8a–8c, which, with the aid of operational amplifiers 9a–9c, produce a saw-tooth signal at reference point 10a–10c of each gate when any of inputs $R_p \ldots T_n$ is positive. The saw-tooth signals are passed to comparators 11a–11c for a comparison to the regulation signal obtained from a PI speed regulator 12. The regulation signal is varied, using a known technique, in accordance with the requirement of the moment, i.e. with the desired speed of rotation of the motor. Circuit 13 produces an absolute value of the voltage of the signal obtained from the speed regulator, and a torque linearization correction is effected by an emphasizing circuit 14, which produces the regulation voltage Ur. Linearization is necessary because the torque of the motor does not respond linearly to changes in the firing angle. The unlinearity depends on the pulse ratio of the current and the cosine form of the firing. The speed regulator would be able to correct the error itself, but it operates too slowly if the torque has a low value, which specifically calls for fast operation.

The drive direction is selected by a circuit 15, the input to which is the drive direction signal and the output a signal for activating the thyristor group corresponding to the selected drive direction, the latter signal being input to the NAND-gates 7a–7g. The selection between normal drive and braking is effected by a circuit 16 on the basis of the regulator output voltage (if the voltage is negative, the motor is to be braked). A normal drive command sent via line 17 activates the NAND-gates 7a–7e, and a braking command via line 18 activates the NAND-gates 7f and 7g, which controls the operation of the thyristor pairs T3, T6 and T7, T10 during braking until the output voltage of the regulator 12 becomes zero.

The selection of the braking mode in which the thyristor pair T7, T10 is used as a zero diode or turned on and off depending on the load (FIG. 2) is accomplished by inputting the regulation voltage Ur to a comparator 19, the other input of which is connected to the fixed reference voltage. Since the information carried by the regulation voltage Ur after linearization by the circuit 14 also includes the value of the torque, this signal can be directly utilized and the required circuitry is quite simple. The result of the comparison is passed from the comparator 19 to one of the inputs of OR-gate 20, the other input of which is fed by the output of comparator 11c. Comparator 11c controls the NAND-gate 7g with the sync pulses of the mains phases S and T, interrupting the direct current voltage as shown in FIG. 2c in the same way as gate 7f controls thyristors T3 and T6, unless comparator 19, because of a need for a high braking torque, keeps gate 20 permanently in the 1-state, which during braking has the effect that gate 7g will continuously fire thyristors T7 and T10 according to the timing set by the oscillator 6 (30 kHz) as shown in FIG. 2b.

Figure 4:
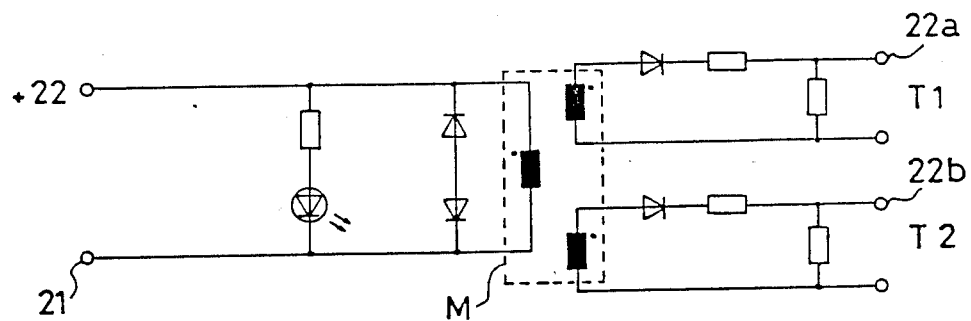
FIG. 4 shows an example of a thyristor firing circuit to be connected to the control logic shown in FIG. 3.

FIG. 4 shows an example of a power controller stage, input 21 of which is fed by the output of one of the NAND-gates 7a–7g in FIG. 3. The 30 kHz pulsating voltage (cycle=mains frequency), galvanically isolated from the power stage by a transformer M, is converted into firing pulses for a thyristor pair, e.g. T1 and T2, by means of two secondary windings, the signals obtained from these windings being passed from terminals 22a and 22b to the gates of the thyristors. For each NAND-gate, one controller like this is needed.

It will be obvious to a person skilled in the art that the different embodiments of the invention are not restricted to the example described above, but that they may be varied within the scope of the following claims.

I claim:

1. A control method for braking a squirrel-cage motor (1) driven through a three-phase voltage converter said converter comprising:
   (a) a thyristor circuit including one antiparallel thyristor pair (T1,T2) connected between a first phase terminal (R) of a three phase AC-power source and the motor (1);
   (b) another thyristor circuit including two antiparallel thyristor pairs (T3,T4 and T5,T6) connected between the second phase terminal (S) of said three phase power source and the motor (1);
   (c) a third thyristor circuit including two antiparallel thyristor pairs (T7,T8 and T9,T10) connected between a third phase terminal (T) of said three phase power source and the motor (1);
   (d) seven firing circuits to fire said thyristors;
   (e) a control circuit for feeding firing commands of said thyristors to said firing circuits;
   said method comprising the steps of:
   activating said firing commands of the thyristors (T1,T2,T3, T4,T9,T10 or T1,T2,T5,T6,T7,T8) depending on a driving direction;
   selecting an operation mode of said converter between an AC-driving mode and a DC-braking mode,
   selecting a DC braking sub-mode, when the DC braking mode is selected, from two sub-modes, a low torque DC braking sub-mode wherein thyristors T3 and T6 are fired so as to produce a pulsating direct current and thyristors T7 and T10 are fired so as to produce continuous direct current, and a high torque DC braking sub-mode wherein thyristors T3,T6,T7, and T10 all are fired so as to produce pulsating direct current, thereby enabling a fast transition back-and-forth between said AC driving mode and said DC braking mode.

2. A control circuit for braking a squirrel-cage motor (1) driven through a three-phase voltage converter, said circuit comprising:
   (a) a thyristor circuit including one antiparallel thyristor pair (T1,T2) connected between a first phase terminal (R) of a three phase AC-power source and the motor (1);
   (b) another thyristor circuit including two antiparallel thyristor pairs (T3,T4 and T5,T6) connected between the second phase terminal (S) of said three phase power source and the motor (1);
   (c) a third thyristor circuit including two antiparallel thyristor pairs (T7,T8 and T9,T10) connected between a third phase terminal (T) of said three phase power source and the motor (1);
   (d) seven firing circuits to fire said thyristors;
   (e) a control circuit for feeding firing commands of said thyristors to said firing circuits;
   (f) an AC-driving-direction-selector-circuit (15) for selectively activating said firing commands of the thyristors T1,T2,T3,T4,T9,T10 or T1,T2,T5,T6,T7,T8 depending on a driving direction;
   (g) an operation mode selector circuit (16) for selecting either an AC driving operation mode or a DC braking operation mode based on a desired motor speed; and
   (h) a DC braking sub-mode selector (19) for selecting a DC braking sub-mode from either a low torque DC braking sub-mode wherein thyristors T3 and T6 are fired so as to produce a pulsating direct current and thyristors T7 and T10 are fired so as to produce a continuous direct current, and a high torque DC braking sub-mode wherein thyristors T3,T6,T7 and T10 all are fired so as to produce a pulsating direct current, thus enabling a fast transition back-and-forth between said AC driving mode and said DC braking mode.

* * * * *